(12) United States Patent
Oster

(10) Patent No.: US 10,068,499 B2
(45) Date of Patent: Sep. 4, 2018

(54) LABEL

(71) Applicant: Phoenix Contact GmbH & Co. KG, Blomberg (DE)

(72) Inventor: Patrick Oster, Lemgo (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 15/516,029

(22) PCT Filed: Sep. 30, 2015

(86) PCT No.: PCT/EP2015/072619
§ 371 (c)(1),
(2) Date: Mar. 31, 2017

(87) PCT Pub. No.: WO2016/050877
PCT Pub. Date: Apr. 7, 2016

(65) Prior Publication Data
US 2017/0337852 A1 Nov. 23, 2017

(30) Foreign Application Priority Data

Oct. 2, 2014 (DE) .................. 10 2014 114 341

(51) Int. Cl.
| | |
|---|---|
| G06K 19/06 | (2006.01) |
| G09F 3/00 | (2006.01) |
| G09F 3/10 | (2006.01) |
| G06K 19/077 | (2006.01) |
| B32B 7/06 | (2006.01) |
| B32B 7/12 | (2006.01) |
| G09F 3/02 | (2006.01) |

(52) U.S. Cl.
CPC .............. G09F 3/0295 (2013.01); B32B 7/06 (2013.01); B32B 7/12 (2013.01); G06K 19/0776 (2013.01);
(Continued)

(58) Field of Classification Search
CPC ......... G06K 17/0025; G06K 19/07718; G06K 19/0776; G06K 19/07758; G06K 19/07722
(Continued)

(56) References Cited

U.S. PATENT DOCUMENTS

| | | |
|---|---|---|
| 6,193,279 B1 | 2/2001 | Seidl |
| 2004/0041392 A1 | 3/2004 | Seidl |

(Continued)

FOREIGN PATENT DOCUMENTS

| | | |
|---|---|---|
| DE | 19746011 C1 | 1/1999 |
| DE | 10052418 A1 | 5/2002 |

(Continued)

*Primary Examiner* — Jamara Franklin
(74) *Attorney, Agent, or Firm* — Leydig, Voit & Mayer, Ltd.

(57) ABSTRACT

A label for being applied, by being wrapped around, to an object to be identified, includes a non-adhesive top side including a printing region for receiving a print on the top side and an adhesive bottom side, by which the label is fastened to the object. The label is in the shape of a strip having a length that is greater than a periphery of the object to be labeled. A transparent wrapping tab is arranged adjacently to the printing region in a longitudinal direction of the label. A length of the wrapping tab is at least equal to the periphery of the object to be labeled. The wrapping tab is wrapped on the printing region and covers the printing region when the label has been applied to the object. An RFID transponder is arranged between the top side and the bottom side in the printing region.

6 Claims, 3 Drawing Sheets

(52) U.S. Cl.
CPC ......... *G06K 19/07718* (2013.01); *G09F 3/10* (2013.01); *B32B 2519/02* (2013.01); *G09F 3/0297* (2013.01); *G09F 2003/0229* (2013.01); *G09F 2003/0269* (2013.01)

(58) Field of Classification Search
USPC ............ 235/487, 488, 492; 340/572.1, 572.8
See application file for complete search history.

(56) References Cited

U.S. PATENT DOCUMENTS

| | | | |
|---|---|---|---|
| 2005/0091896 A1 | 5/2005 | Kotik et al. | |
| 2007/0145150 A1 | 6/2007 | Barczyk et al. | |
| 2010/0045437 A1* | 2/2010 | Hioki | B32B 37/226 340/10.1 |
| 2010/0060459 A1 | 3/2010 | Stole et al. | |

FOREIGN PATENT DOCUMENTS

| | | |
|---|---|---|
| DE | 102004043301 B4 | 3/2006 |
| DE | 112004001845 T5 | 10/2007 |
| DE | 102008058765 A1 | 4/2010 |
| DE | 102012112297 A1 | 6/2014 |
| EP | 0186112 A2 | 7/1986 |
| EP | 2105870 A1 | 9/2009 |
| EP | 2581897 A1 | 4/2013 |
| GB | 2309955 A | 8/1997 |

* cited by examiner

LABEL

CROSS-REFERENCE TO PRIOR APPLICATIONS

This application is a U.S. National Phase application under 35 U.S.C. § 371 of International Application No. PCT/EP2015/072619, filed on Sep. 30, 2015, and claims benefit to German Patent Application No. DE 10 2014 114 341.8, filed on Oct. 2, 2014. The International Application was published in German on Apr. 7, 2016 as WO 2016/050877 under PCT Article 21(2).

FIELD

The invention relates to a label for being applied, by being wrapped around, to an object to be identified, comprising a non-adhesive top side and an adhesive bottom side, by means of which the label is fastened to the object, there being a printing region for receiving a print on the top side.

BACKGROUND

DE 10 2004 043 301 B4 discloses an adhesive label of this kind. Said label is applied to bottle-like or ampule-like containers with overlap, a peel-off portion being provided in the overlap region.

Labels of this kind, in particular labels made of plastics material, present a problem of the print being smudged on account of the smoothness of the plastics surface that has been printed on. Moreover, in particular if the labels are used in harsh environments, the print needs to be protected against soiling.

EP 0 186 112 A2 discloses a label in the form of an identification tag for cables, pipes, containers, and the like. In order to protect the print against smudging and soiling, said document proposes applying a transparent covering sheet, as a self-adhesive film, to the identification carrier sheet having the print. The thus ready-laminated identification tag can, in this form, be fastened to the object to be identified by means of a link that engages through a hole. The thus laminated identification tag can also be applied to the object to be identified as a planar self-adhesive tag having an adhesive layer provided on the bottom side thereof. However, applying a covering sheet after the print has been produced is relatively time-consuming, in particular if the prints are to be produced individually.

DE 11 2004 001 845 T5 discloses a tape having a plurality of adhesive labels that can be peeled off and that are applied, for example, to ampules. The labels disclosed therein comprise a print on the surface thereof for identification and additionally contain an RFID transponder (radio frequency identification) on the inside for identification. Said document does not disclose protecting the print against smudging and soiling. DE 11 2004 001 845 T5 also does not describe providing special protection for the relatively delicate RFID transponder against mechanical loads (e.g. impacts), which could arise e.g. when handling labeled cables in an industrial production environment.

DE 10 2008 058 765 A1 discloses an RFID transponder, in the form of an RFID tag, that is embedded in a special molded body and is sewn e.g. into garments. In this case, the molded body is used to protect the RFID transponder against mechanical loads. Said RFID tag is, however, not suitable as a label for being applied to objects by being wrapped around. Furthermore, said RFID tag does not have a printing region for a print.

SUMMARY

In an embodiment, the present invention provides a label for being applied, by being wrapped around, to an object to be identified. The label comprimises: a non-adhesive top side including a printing region for receiving a print thereon and an adhesive bottom side, by which the label is fastened to the object, wherein the label is in the shape of a strip having a length that is greater than a periphery of the object, wherein a transparent wrapping tab is arranged adjacently to the printing region in a longitudinal direction of the label, wherein a length of the wrapping tab is at least equal to the periphery of the object, wherein the wrapping tab is wrapped on the printing region and covers the printing region when the label has been applied to the object, and wherein an RFID transponder is arranged between the top side and the bottom side in the printing region.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
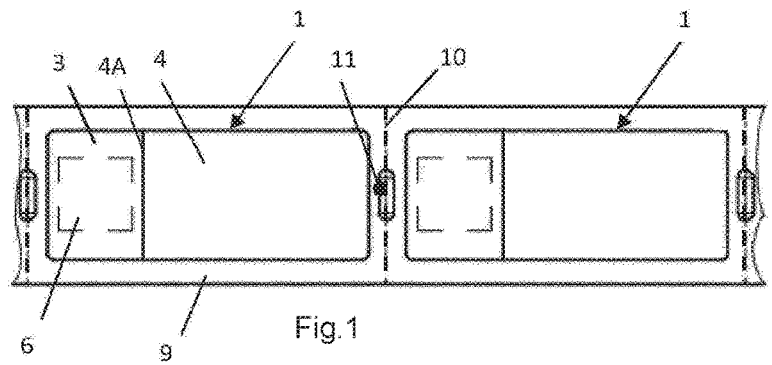
FIG. 1 is a plan view of two labels that have not yet been printed on and are arranged on a continuous protective layer.

The label according to the invention, which is applied, by being wrapped around, to an object to be identified, comprises a non-adhesive top side and an adhesive bottom side, by means of which the label is fastened to the object. The label according to the invention can also be referred to as a wrapping label. There is a printing region for receiving a print on the top side, the label being in the shape of a strip having a length that is greater than the periphery of the object to be labeled. According to the invention, a transparent wrapping tab is arranged adjacently to the printing region in the longitudinal direction of the label, the wrapping tab being wrapped on the printing region and covering the printing region when the label has been applied to the object.

An RFID transponder is arranged inside the label, i.e. between the top side and the bottom side, in the printing region.

By the wrapping tab being, on account of the length thereof, wrapped on and covering the printing region when the label has been applied to the object by being wrapped around, the print located under the wrapping tab in said region is protected against smudging and soiling. Since the wrapping tab is transparent, the print located thereunder remains clearly legible. Since the sensitive RFID transponder is arranged between the top side and the bottom side of the label and, according to the invention, in the printing region, the RFID transponder is protected against impacts by the wrapping tab wrapping around and covering the printing region since the wrapping tab forms an additional protective layer here. In particular when identifying objects in an industrial environment, the labels often remain on the objects, e.g. a cable, for a very long time. After some time, this may result in tears in the top side of the label, through which moisture can enter. When the object is labeled, the wrapping tab wrapped on the printing region and thus on the RFID transponder as an additional layer also protects the RFID transponder against the ingress of moisture.

So that the wrapping tab is wrapped around the printing region completely, the length of the wrapping tab is at least equal to the periphery of the object to be labeled.

In an advantageous embodiment, the label comprises a layer that is transparent over the entire length thereof and that comprises on the rear side thereof a transparent adhesive coating forming the bottom side of the label in the region of the wrapping tab, whilst the transparent layer forms, on the top side thereof, the non-adhesive top side of the label over the entire length of the label. A colored (non-transparent) background layer is arranged on the rear side of the transparent layer in the printing region. Said colored background layer provides, irrespective of the color of the object to be labeled, a neutral colored background layer for the print and increases contrast. A white background layer is preferably selected. Advantageously, the RFID transponder is sandwiched between the side of the background layer that faces away from the transparent layer and an adhesive layer opposite the background layer, said adhesive layer forming the adhesive bottom side of the label in the printing region of the label. By the RFID transponder being embedded in a sandwich-like manner in this position, said transponder is additionally protected against impacts by the background layer, which improves the legibility of the print.

In a particularly advantageous development of the above-described embodiment, the RFID transponder comprises a substrate having the RFID antenna structure, the integrated circuit component (RFID IC) of the RFID transponder being arranged on the substrate so as to be elevated. Here, an intermediate adhesive layer is arranged on the side of the substrate that has the RFID IC, which intermediate adhesive layer has a recess in the region of the RFID IC and a thickness that corresponds to the height of the RFID-IC. The elevation, namely the RFID IC, is leveled with respect to the antenna substrate by the intermediate adhesive layer designed in this manner, and therefore the RFID transponder has a planar surface on the side thereof that faces the background layer. This avoids a locally raised portion on the background layer and in the printing region of the label, which portion would be highly disruptive to producing the print, in particular to producing a print using a tactile printing method (e.g. thermal transfer printing).

Preferably, the length of the wrapping tab is greater than the periphery of the object to be labeled. In this embodiment, the wrapping tab is wrapped on the printing region not only completely, but instead wraps so far around that it extends even beyond the printing region, the portion of the wrapping tab that wraps so far round that it extends beyond the printing region being adhesively fastened to an already applied portion of the wrapping tab. The wrapping tab thus projects beyond the end of the printing region, the wrapping tab being additionally refastened to itself and thus additionally fixing the printing region into position. This reliably prevents the label from peeling away from the object in the printing region. Since the label is, on account of the RFID transponder arranged in the printing region, more rigid in said region than in the region of the wrapping tab, the label tends to peel away in the printing region if said label is fastened to an object having a curved surface. The rigidity of the label is increased even further in said region if a background layer is also arranged adjacently to the RFID transponder in the printing region. The label is prevented from peeling away by the wrapping tab being adhered over the top, as described above.

In order to protect the adhesive effect of the adhesive bottom side of the label and improve the handling of the label before it is applied to objects to be labeled, the label is arranged, by the adhesive bottom side thereof, on a protective layer which is peeled off the adhesive bottom side before the label is applied. The material of the protective layer is selected such that said layer can be peeled off without destroying the adhesive bottom side and without taking away adhesive components.

FIG. 1 is a plan view of part of a label tape having two labels (1) that have not yet been printed on and are arranged on a continuous protective layer (9). The labels (1) are individually peeled off the protective layer (9) before they are applied to the objects (13) to be labeled. In order for it to be possible to separate the labels having a particular protective layer (9), the protective layers (9) of adjacent labels (1) are interconnected so as to be detachable, in particular by means of a perforation line (10). Preferably here, the protective layers are each slightly longer and slightly wider than the labels (1) arranged thereon.

In order for a print to be produced thereon, the labels (1) arranged on the protective layer (9) are individually fed, one after the other, to a printer (e.g. a thermal transfer printer or inkjet printer), although in a manner in which said labels are still linked together in the form of a tape comprising a plurality of labels. An opening (12), through which light can pass and which is intended for light barrier control of the printer, is provided on the separating line (10) between adjacent protective layers (9).

However, it is also possible to supply a printer with labels (1) having already been separated, i.e. detached from the tape.

The strip-shaped labels (1) comprise a printing region (3) for receiving the print. A transparent wrapping tab (4) is arranged adjacently to the printing region (3) in the longitudinal direction of the label (1). The delimitation between the printing region (3) and the wrapping tab (4) is marked by a separating line (4A). An RFID transponder (6) is located inside the label (1), i.e. between the non-adhesive top side (2A) and an adhesive bottom side (2B). Said transponder is arranged, in relation to the surface of the label (1), in the printing region (3). In the plan view according to FIG. 1, the RFID transponder (6) is located under the top side (2A) of the label, on which the print is produced. In the plan view according to FIG. 1, the RFID transponder (1) is therefore indicated by a dashed line.

Figure 2:
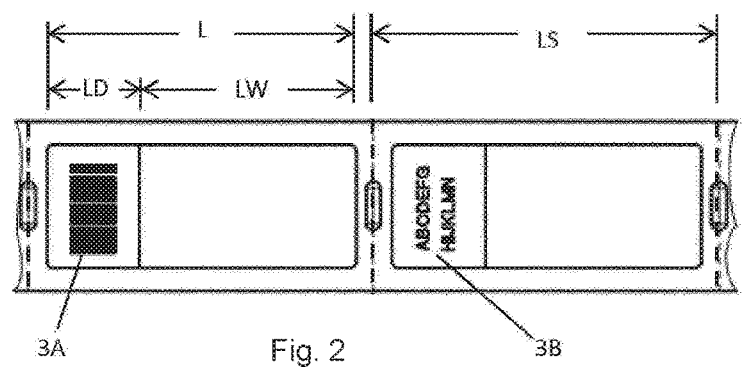
FIG. 2 is a plan view, as in FIG. 1, a barcode having been printed on the first label and a sequence of letters having been printed on the second label.

FIG. 2 is a plan view, as in FIG. 1, although after the print has been produced and before the label has been applied to the object to be labeled. Here, a barcode (3A) is printed on the first label (1) and a sequence of letters (3B) is printed on the second label (1).

The printing region (3) is a defined, marked region on the top side (2A) of the label (1) that is provided for and suitable for the print. The print itself is located within the printing region, but need not completely fill said region.

Figure 3:
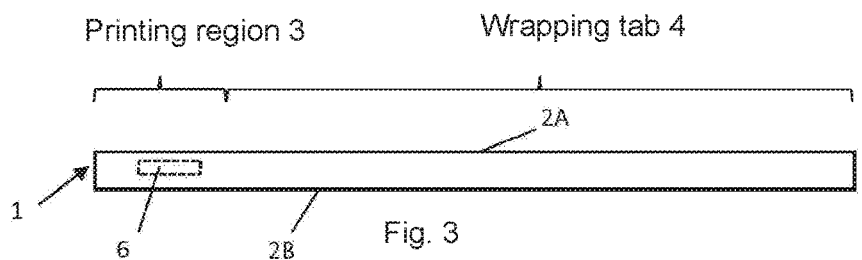
FIG. 3 is a section through a label, in which the RFID transponder arranged inside the label in the printing region is shown.

FIG. 3 is longitudinal section through a label, the scale in the sectional plane perpendicular to the longitudinal extension of the label being shown in a greatly enlarged view. The strip-shaped label (1) shown therein comprises a plastics layer, of which the bottom side (2B) is provided with an adhesive coating. The top side (2A) is non-adhesive. The RFID transponder (6) is arranged inside the plastics layer, i.e. between the top side and the bottom side. Here, the RFID transponder (6) is arranged in the printing region (3), which adjoins the wrapping tab (4).

The plastics layer shown in FIG. 3 can be a single plastics layer (plastics film) or a plastics layer block comprising two or more plastics layers (plastics films) that are arranged one on top of the other and are interconnected by adhesive bonding and/or lamination. In the case of a plastics layer block, the bottom plastics layer is an adhesive layer or a plastics layer, of which the bottom side (2B) comprises an adhesive coating.

The RFID transponder (6) is preferably embedded between two plastics films that are interconnected by adhesive bonding and/or lamination. Polyvinyl chloride (PVC), for example, can be used as the material for the plastics layer(s) since PVC is highly suitable for producing a print thereon, in particular in a thermal transfer method.

In an embodiment, the label (1) is completely transparent over the entire length thereof. In an advantageous embodiment, the label (1) is only transparent in the region of the wrapping tab (4), whilst the label (1) is colored, preferably white, in the region of the printing region (3) so as to form a neutral background color for the print.

For this purpose, the label material, e.g. PVC, can accordingly be locally tinted in the printing region. The background color marks the printing region (3) and delimits said region from the transparent wrapping tab (4).

Figure 4:
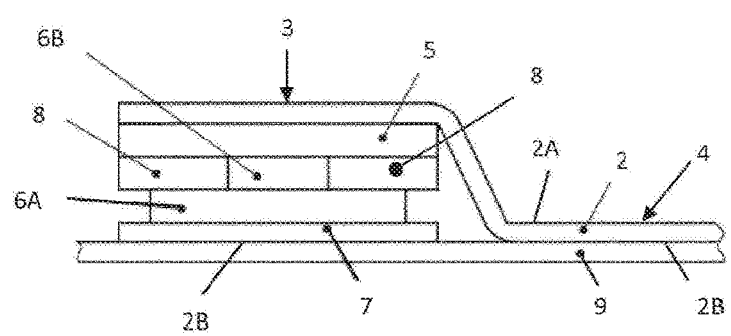
FIG. 4 is a section through a label in a particularly advantageous embodiment, comprising various layers in the printing region.
Figure 5:
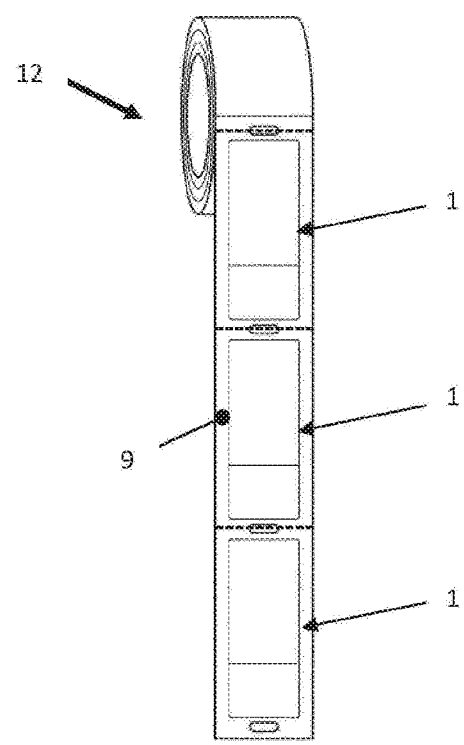
FIG. 5 shows a label tape reel.

FIG. 4 shows an embodiment in which the background color is produced by an additional colored background layer (5). Here, the scale perpendicular to the longitudinal extension of the label, as in FIG. 3, has been greatly enlarged.

In this case, the label (1) comprises a layer (2), e.g. comprising PVC, that is transparent over the entire length (L) thereof and comprises a transparent adhesive coating, e.g. acrylate-based, on the rear side. Said rear-side adhesive coating forms the bottom side (2B) of the label (1) in the region of the wrapping tab (4). The top side of the transparent layer (2) forms the top side (2A) of the label (1) over the entire length (L) of the label (1). In order to form a neutral background color, a colored background layer (5) is arranged on the rear side of the transparent layer (2) in the printing region (3). Said background layer can comprise, for example, a tinted PVC. The RFID transponder (6, 6A, 6b) is sandwiched here between the side of the background layer (5) that faces away from the transparent layer (2) and an adhesive layer (7) opposite the background layer (5). The adhesive layer (7) can comprise an acrylate-based pressure-sensitive adhesive. Said adhesive layer (7) forms the adhesive bottom side (2A) of the label (1) in the printing region (3) of the label (1). Since the RFID transponder (6) is sandwiched behind the transparent layer (2) and the colored background layer (5), said transponder is further protected by the additional layer (5). The colored background layer (5), which can be seen through the transparent layer, marks the printing region on the top side of the transparent layer (2), which is printed on.

The thickness of the label (1), without the protective layer (9), is approximately 400 µm to 600 µm in the printing region. The thickness of the RFID transponder is approximately 250 µm to 400 µm. The thickness of the transparent layer (2) coated with adhesive on one side is approximately 40 mm to 70 µm; the thickness of the colored background layer is approximately 80 µm to 110 µm; and the thickness of the adhesive coating (7) is approximately 20 µm. Said adhesive coating (7) is preferably arranged on the rear side of the RFID transponder (6), in particular on the rear side of the antenna substrate (6B).

The protective layer (9) preferably comprises calendered paper (suitable as separating paper), which advantageously comprises a silicon coating on the side that supports the label (1) by the adhesive bottom side (2B), as a result of which residue-free peeling of the label (1) is ensured. The thickness of the protective layer (9) is approximately 50 µm to 60 µm.

If the RFID transponder (6), which is installed in the label (1) as a component, comprises an inner step-like structure comprises a substrate (6A) having the RFID antenna structure and of an RFID IC (6B) arranged thereon so as to be elevated, an intermediate adhesive layer (8) is advantageously arranged on the side of the substrate (6A) that has the RFID IC (6B), which intermediate adhesive layer has a recess in the region of the RFID IC (6B) and a thickness that corresponds to the height of the RFID IC (6B). The intermediate adhesive layer (8) connects the RFID transponder (6) to the colored background layer (5). The elevation, namely the RFID IC (6B), is leveled with respect to the antenna substrate (6A) by the intermediate adhesive layer (8) designed in this manner, and therefore the RFID transponder (6) has, on the side that faces the background layer (5), a planar surface overall. A locally raised portion is thus avoided on the background layer (5) and in the printing region (3) of the label, which raised portion would be highly disruptive to producing the print, in particular to producing a print using a tactile printing method (e.g. thermal transfer printing).

In the following, the label is defined with reference to dimensions of the object on which the label, when used, is applied by being wrapped around:

The length (L) of the label (1) is overall greater than the periphery (U) of the object (13) to be labeled, the length (LW) of the wrapping tab (4) being at least equal to the periphery (U) of the object (13) to be labeled. The periphery (U) of the object (13) to be labeled is the length of the periphery. In an object having a circular peripheral cross section, the periphery (U) corresponds to the circle circumference ($2\pi r$). The length (L) of the label (1) and the length (LW) of the wrapping tab (4) are measured in the direction of the adjacent arrangement of the printing region (3) and the wrapping tab (4). The length relationships can be summarized as follows:

L>U

LW≥U

LW≥LD

The length (LS) of the individual protective layers (9) is greater than the length of the labels (L): LS>L.

Figure 6:
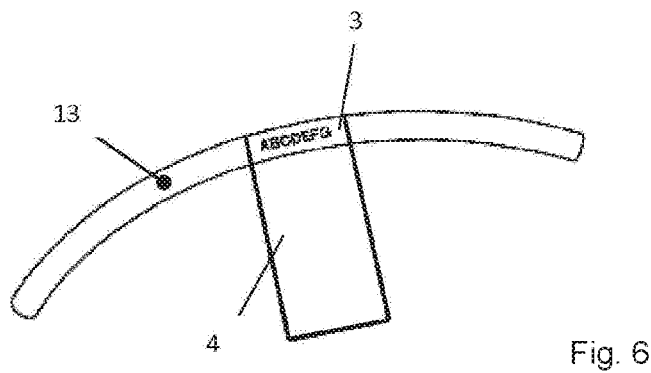
FIG. 6 shows a cable as an object to be identified, the printing region of the label having already been wrapped around the cable.
Figure 7:
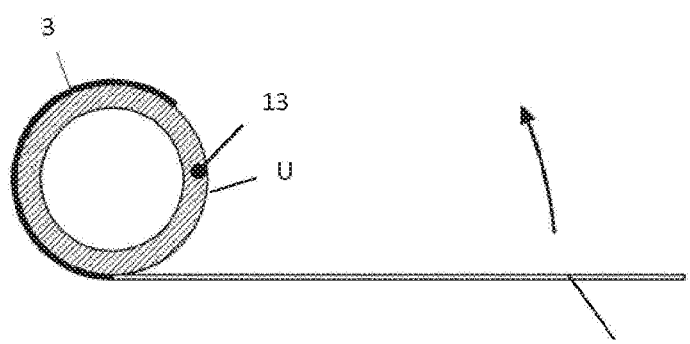
FIG. 7 is a section through the cable (see FIG. 6) having a label that has been partially wrapped around.

When the label (1) is applied to the object to be labeled, the label (1) is first wrapped, by the printing region (1) thereof, onto the object (13) (see FIG. 6 and FIG. 7), the label (1) being placed onto the surface of the object (13) by the adhesive bottom side (2B). The wrapping tab (4) is then wrapped onto the object (13) and over the printing region (3). Here, the label (1) adheres, by the adhesive bottom side (2B), to the surface of the object (13) to be labeled, the wrapping tab (4) adhering, likewise by the adhesive bottom side (2B) thereof, to the top side (2B) of the label (1) in the printing region (3) and optionally to the surface of the object (13) again.

When the label (1) has been applied to the object (13), on account of the above-defined length relationships the wrapping tab (4) is wrapped on the printing region (3) and covers said printing region and the RFID transponder (6) arranged under said region. The print (3A, 3B) located under the wrapping tab (4) in said region is thereby protected against smudging and soiling. Since the wrapping tab (4) is transparent, the print (3A, 3B) located thereunder remains clearly legible. Furthermore, the wrapping tab (4) wrapped on the printing region (3) also protects the RFID transponder (6) located under said tab against impacts and the ingress of moisture.

Figure 8:
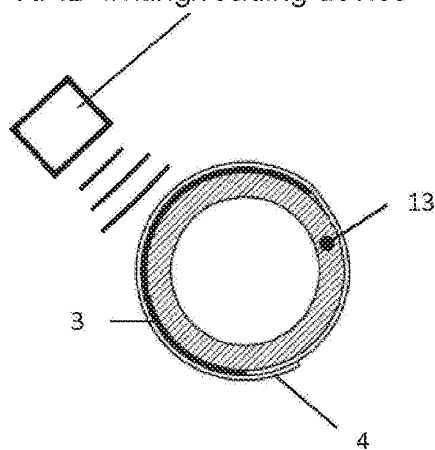
FIG. 8 is a section through the cable having a label that has been completely wrapped around.
Figure 9:
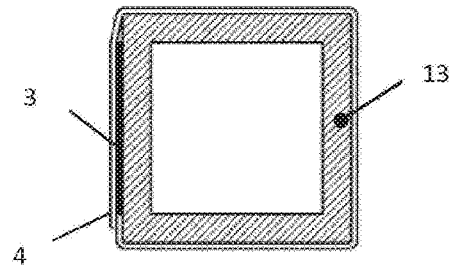
FIG. 9 is a section through an object to be identified having a rectangular cross section, the label having been completely wrapped around.

In the preferred embodiment, the length (LW) of the wrapping tab (4) is greater than the periphery (U) of the object (13) to be labeled. In this embodiment, the wrapping tab (4) is wrapped on the printing region (3) not only completely, but instead wraps so far around that it extends even beyond the printing region (3) (see FIG. 8 and FIG. 9), the portion of the wrapping tab (4) that wraps so far round that it extends beyond the printing region (3) being adhesively fastened to an already applied portion of the wrapping tab (4). The wrapping tab (4) thus projects beyond the end of the printing region (3), the wrapping tab (4) being additionally refastened to itself and thus additionally fixing the printing region (3) into position. This reliably prevents the label (1) from peeling away from the object (13) in the printing region. Since the label (1) is, on account of the background film (5) and on account of the RFID transponder (6) arranged in the printing region (optionally plus the colored background layer), more rigid in said region than in the region of the wrapping tab (4), the label (1) tends to peel away in the printing region (3) if said label is fastened to an object having a curved surface. This is prevented by the wrapping tab (4) being adhered over the top, as described above.

The objects (13) to be labeled may have a round, oval or angled peripheral cross section.

Electrical cables and pipe lines used e.g. in an industrial production environment, for example, are possible objects (13) to be labeled. The labels (1) according to the invention can, however, be used just as effectively on ampules, test tubes or sample containers used e.g. in a medical laboratory.

Since there are two possibilities for identification, namely a) by producing a print and b) by writing information in the integrated circuit (RFID IC) of the RFID transponder (6), the label offers several advantages. The information applied by producing a print is read out optically by being read out manually or by being read out by a machine (e.g. by a barcode scanner). The information in the RFID transponder is written in and read out wirelessly by radio. This takes place using what are referred to as RFID writing/reading devices (see FIG. 8). Here, the RFID transponder (6) can then also be read out by radio relatively easily if the print on the label (1) cannot visually be readily accessed.

The RFID transponder and the print can redundantly contain the same information such that the reliability for identification is increased. On account of the memory, a larger amount of information can also be stored in the RFID IC than in the print, and therefore the information in the print can, in a simple manner, be extensively supplemented by the information in the RFID transponder. RFID transponders that work at various frequency ranges and have various working ranges can be used in the label according to the invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 label
2 transparent layer
2A top side
2B bottom side
3 printing region
3A barcode
3B sequence of letters
4 wrapping tab
4A separating line between the printing region and the wrapping tab
5 colored background layer
6 RFID transponder
6A substrate of the RFID transponder
6B IC of the RFID transponder
7 adhesive layer
8 intermediate adhesive layer
9 protective layer
10 perforation line in the protective layer
11 opening in the protective layer through which light can pass
12 label sheet reel
13 object to be labeled
L length of the label
LW length of the wrapping tab LD length of the printing region
LS length of the protective layer
U periphery

The invention claimed is:

1. A label for being applied, by being wrapped around, to an object to be identified, the label comprising:
   a non-adhesive top side including a printing region for receiving a print thereon; and
   an adhesive bottom side, by which the label is fastened to the object,
   wherein the label is in the shape of a strip having a length that is greater than a periphery of the object,
   wherein a transparent wrapping tab is arranged adjacently to the printing region in a longitudinal direction of the label,
   wherein a length of the wrapping tab is at least equal to the periphery of the object,
   wherein the wrapping tab is wrapped on the printing region and covers the printing region when the label has been applied to the object, and
   wherein an RFID transponder is arranged between the top side and the bottom side in the printing region.

2. The label according to claim 1, wherein the adhesive bottom side is arranged on a protective layer, the protective layer being configured to be peeled off the adhesive bottom side.

3. A label for being applied, by being wrapped around, to an object to be identified, the label comprising:
   a non-adhesive top side including a printing region for receiving a print thereon; and
   an adhesive bottom side, by which the label is fastened to the object,
   wherein the label is in the shape of a strip having a length that is greater than a periphery of the object,
   wherein a transparent wrapping tab is arranged adjacently to the printing region in a longitudinal direction of the label,
   wherein a length of the wrapping tab is at least equal to the periphery of the object,
   wherein the wrapping tab is wrapped on the printing region and covers the printing region when the label has been applied to the object,
   wherein an RFID transponder is arranged between the top side and the bottom side in the printing region, and
   wherein the label comprises a layer that is transparent over an entire length thereof that comprises on the rear side a transparent adhesive coating forming the bottom side of the label in the region of the wrapping tab, and that forms on the top side the top side of the label over the entire length of the label, a colored background layer being arranged on the rear side of the transparent layer in the printing region, the RFID transponder being sandwiched between the side of the background layer that faces away from the transparent layer and an adhesive layer opposite the background layer, the adhesive layer forming the adhesive bottom side of the label in the printing region of the label.

4. The label according to claim 3, wherein the RFID transponder comprises a substrate having an RFID antenna structure, an integrated circuit component of the RFID transponder being arranged on the substrate so as to be elevated, an intermediate adhesive layer being arranged on the side of the substrate that has the RFID integrated circuit and having a recess in the region of the RFID integrated circuit and a thickness that corresponds to the height of the RFID integrated circuit.

5. A label tape reel, comprising:
   a plurality of labels for being applied, by being wrapped around, to an object to be identified, each label comprising:
      a non-adhesive top side including a printing region for receiving a print thereon; and
      an adhesive bottom side, by which the label is fastened to the object,
      wherein the label is in the shape of a strip having a length that is greater than a periphery of the object,
      wherein a transparent wrapping tab is arranged adjacently to the printing region in a longitudinal direction of the label,
      wherein a length of the wrapping tab is at least equal to the periphery of the object,
      wherein the wrapping tab is wrapped on the printing region and covers the printing region when the label has been applied to the object,
      wherein an RFID transponder is arranged between the top side and the bottom side in the printing region,
      wherein the adhesive bottom side is arranged on a protective layer, the protective layer being configured to be peeled off the adhesive bottom side, and
   wherein each of the plurality of labels is arranged on a protective layer, and
   wherein the protective layers of adjacent labels are interconnected so as to be detachable via a perforation line.

6. The label tape reel according to claim 5, wherein a length of a particular protective layer is greater than a length of the label located thereon, there being an opening, through which light can pass and which acts as a light barrier control of a printer, on the separating line between adjacent protective layers.

* * * * *